(12) United States Patent
Rieboldt et al.

(10) Patent No.: US 11,428,145 B2
(45) Date of Patent: Aug. 30, 2022

(54) INSULATION SYSTEMS AND DEVICES

(71) Applicant: Caterpillar Inc., Deerfield, IL (US)

(72) Inventors: Ryan Rieboldt, Peoria Heights, IL (US); Scott Peters, Edwards, IL (US); Jason Hudgens, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 568 days.

(21) Appl. No.: 16/245,952

(22) Filed: Jan. 11, 2019

(65) Prior Publication Data

US 2020/0224578 A1 Jul. 16, 2020

(51) Int. Cl.
*F01N 13/10* (2010.01)
*F16L 59/02* (2006.01)
*F01N 13/14* (2010.01)

(52) U.S. Cl.
CPC ........... *F01N 13/102* (2013.01); *F01N 13/14* (2013.01); *F16L 59/02* (2013.01); *F16L 59/026* (2013.01)

(58) Field of Classification Search
CPC .... F01N 13/102; F01N 13/14; F01N 2450/18; F16L 59/02; F16L 59/026
USPC ........................................................ 422/179
See application file for complete search history.

(56) References Cited

U.S. PATENT DOCUMENTS

| | | |
|---|---|---|
| 3,589,971 A | 6/1971 | Reed |
| 4,112,967 A | 9/1978 | Withem |
| 4,182,122 A | 1/1980 | Stratton et al. |
| 4,207,918 A | 6/1980 | Burns et al. |
| 4,258,821 A | 3/1981 | Wendt et al. |
| 7,530,603 B2 | 5/2009 | Fernandes et al. |
| 8,758,694 B2 * | 6/2014 | Xiao ............... F01N 3/2853 422/179 |
| 2008/0006434 A1 | 1/2008 | Nygaard et al. |
| 2016/0084140 A1 | 3/2016 | Dietz |
| 2018/0100416 A1 | 4/2018 | Lee et al. |

FOREIGN PATENT DOCUMENTS

JP 2011149338 A 8/2011

* cited by examiner

*Primary Examiner* — Tom P Duong
(74) *Attorney, Agent, or Firm* — Bookoff McAndrews, PLLC

(57) ABSTRACT

An insulation system for an aftertreatment system includes a first insulating element including at least one slit, and a second insulating element including a plurality of fingers extending from opposing sides of an aperture. The second insulating element is couplable to the first insulating element, and when the second insulating element is coupled to the first insulating element, the plurality of fingers overlap the at least one slit.

20 Claims, 4 Drawing Sheets

INSULATION SYSTEMS AND DEVICES

TECHNICAL FIELD

The present disclosure relates generally to insulation systems and devices, and more particularly, to insulation systems and devices for internal combustion engines.

BACKGROUND

Internal combustion engines generate significant heat which may be transferred by exhaust gases to the exhaust components, e.g., the aftertreatment system, of the engine. Insulating or thermally isolating the exhaust components may protect other components of the engine and nearby machinery from excessive heat and improve safety for operators. Thermal isolation of engine exhaust components may also be required in order to comply with regulations. For example, marine engines must meet surface temperature limits associated with the International Convention for the Safety of Life at Sea (SOLAS). Additionally, various sensors may be coupled to one or more engine components and be in communication with one or more monitors or controllers via one or more wires or cables. The sensors and the wires or cables may require openings in the insulation in order to help prevent or avoid overheating the sensors, wires, and cables, to allow for the removal, inspection, or replacement of the sensors, and to allow the wires and cables to connect the sensors to the monitors or controllers.

One example of a heat insulation structure for a portion of an exhaust system is disclosed in U.S. Patent Application Publication No. 2018/0100416 of Lee et al., published on Apr. 12, 2018 ("the '416 publication"). The heat insulation structure of the '416 publication includes a cover formed of an insulating material that may be positioned around various portions of a catalytic converter. Although the heat insulation structure of the '416 publication may be useful in certain systems or structures, it may not be suitable for other systems or structures.

The system of the present disclosure may solve one or more of the problems set forth above and/or other problems in the art. The scope of the current disclosure, however, is defined by the attached claims, and not by the ability to solve any specific problem.

SUMMARY

In one aspect, an insulation system for an aftertreatment system may include a first insulating element including at least one slit, and a second insulating element including a plurality of fingers extending from opposing sides of an aperture. The second insulating element may be couplable to the first insulating element, and when the second insulating element is coupled to the first insulating element, the plurality of fingers overlap the at least one slit.

In another aspect, an aftertreatment system may include an intake spool, a treatment module coupled to the intake spool, and an outlet spool extending from the treatment module. The aftertreatment system may also include a first insulation assembly coupled to the intake spool, including a first primary blanket and a first secondary blanket, where the first secondary blanket is coupled to the first primary blanket. The aftertreatment system may further include a second insulation assembly coupled to the outlet spool, including a second primary blanket and a second secondary blanket, wherein the second secondary blanket is coupled to the second primary blanket.

In a further aspect, a insulation element for a marine aftertreatment system may include an aperture extending through the insulation element from an exterior to an interior of the insulation element and a plurality of fingers. Each finger may include a fixed end and a free end. The fixed end of each finger may be positioned on either a first or a second side of the aperture, and the free end of each finger may be configured to be coupled to the insulation element on the other of the first or second side of the aperture.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "aftertreatment system" is broadly used to refer to all types of systems that treat engine exhaust (e.g., filters, injecters, catalytic converters, etc.). Moreover, in this disclosure, relative terms, such as, for example, "about," "substantially," and "approximately" are used to indicate a possible variation of ±10% in the stated value.

Figure 1:
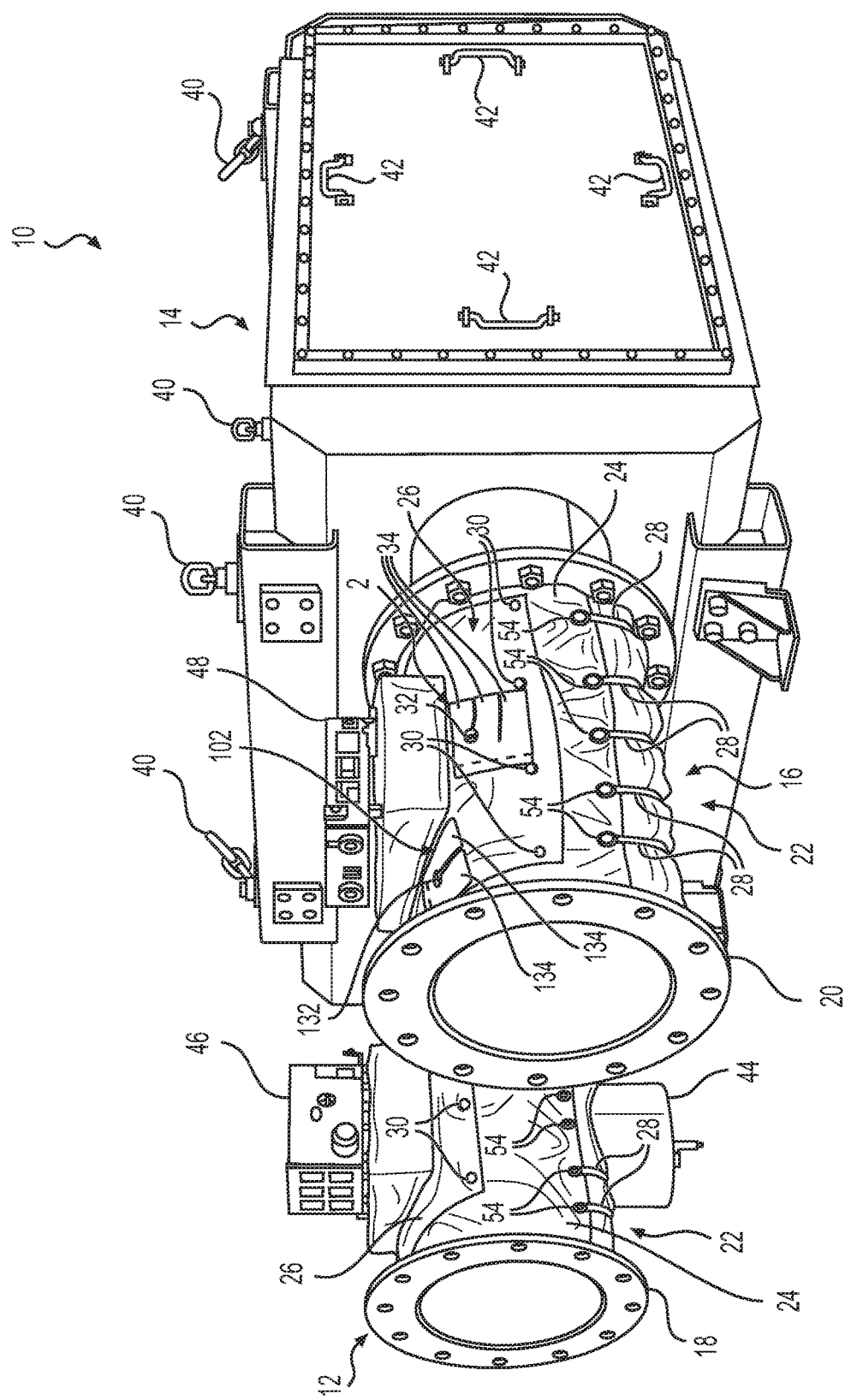
FIG. 1 is a perspective view of a exemplary exhaust after treatment system with an insulation system, according to aspects of the present disclosure.

FIG. 1 illustrates an aftertreatment system 10 with an intake assembly 12, a treatment module 14, and an outlet assembly 16, according to the present disclosure. Intake assembly 12 includes an intake spool 18, which may connect the engine (not shown) to treatment module 14, and outlet assembly 16 includes an outlet spool 20, which may connect treatment module 14 to an exhaust outlet (not shown) to release the treated engine exhaust. At least a portion of the exterior of one or more of intake assembly 12 (e.g., intake spool 18) or outlet assembly 16 (e.g., outlet spool 20) may be at least partially covered by an insulation assembly 22. Insulation assembly 22 may include a first insulating element, for example, a primary blanket 24, and a second insulating element, for example, a secondary blanket 26. Primary blanket 24 may be sized to cover a majority of intake assembly 12 or outlet assembly 16. Secondary blanket 26 may be sized to overlap with a portion of primary blanket 24 and cover at least a portion of the intake assembly 12 or outlet assembly 16 that is not covered by primary blanket 24. Primary blanket 24 may be secured around a portion of intake spool 18 or outlet spool 20 via one or more straps 28. Secondary blanket 26 may be secured around a portion of intake spool 18 or outlet spool 20 and coupled to primary blanket 24 via a plurality of couplings 30, for example, snaps, buttons, hook and loop fasteners (Velcro™), adhesives, magnets, etc. Additionally, primary blanket 24 may include one or more slits 32, 132 (FIGS. 2-4) to partially expose one or more sensors, wires, or cables, and secondary blanket 26 may include one or more fingers 34, 134 to help insulate the one or more sensors, wires, or cables that are exposed through one or more of slits 32, 132. Slit 32 and fingers 34 may form a first insulation arrangement 2, and slit 132 and fingers 134 may form a second insulation arrangement 102.

Aftertreatment system 10 may be used on any internal combustion engine, for example, an engine used to power a marine machine. Alternatively, aftertreatment system 10 may be coupled to an engine for another vehicle, for example, a car, truck, bus, boat, recreational vehicle, construction equipment, locomotive, etc., or aftertreatment system 10 may be coupled to an engine for a non-vehicular system, for example, a generator set. In either aspect, treatment module 14 may include one or more hooks 40 or one or more handles 42 on an exterior of treatment module 14, which may help position and/or couple aftertreatment system 10 within or on the vehicle or non-vehicular system.

Aftertreatment system 10 may include one or more catalysts, filters, etc. in order to treat exhaust gas from the engine. For example, aftertreatment system 10 may include an injection unit 44 coupled to intake assembly 12. Injection unit 44 may inject diesel exhaust fluid (e.g., urea, deionized water, and/or other reactants) into the interior of intake spool 18. Although not shown, aftertreatment system may include one or more filters, mixers, and/or catalysts positioned within intake assembly 12, treatment module 14, and outlet assembly 16 to treat exhaust and remove various particulates and chemicals before the exhaust is released.

Furthermore, intake assembly 12 and outlet assembly 16 may each include respective control boxes 46, 48. For example, intake control box 46 may be coupled to a plurality of sensors (e.g., a temperature sensor, a nitrogen oxide (NOx) sensor, a pressure sensor, etc.) and/or control units positioned on or within intake spool 18, and outlet control box 48 may be coupled to a plurality of sensors (e.g., a temperature sensor, a nitrogen oxide (NOx) sensor, a pressure sensor, etc.) and/or control units positioned on or within outlet spool 20. Intake control box 46 and outlet control box 48 may communicate information from the respective sensors and/or control units to a master controller, user interface, etc., and/or may control the internal systems of aftertreatment system 10 based on the sensed information.

Figure 2:
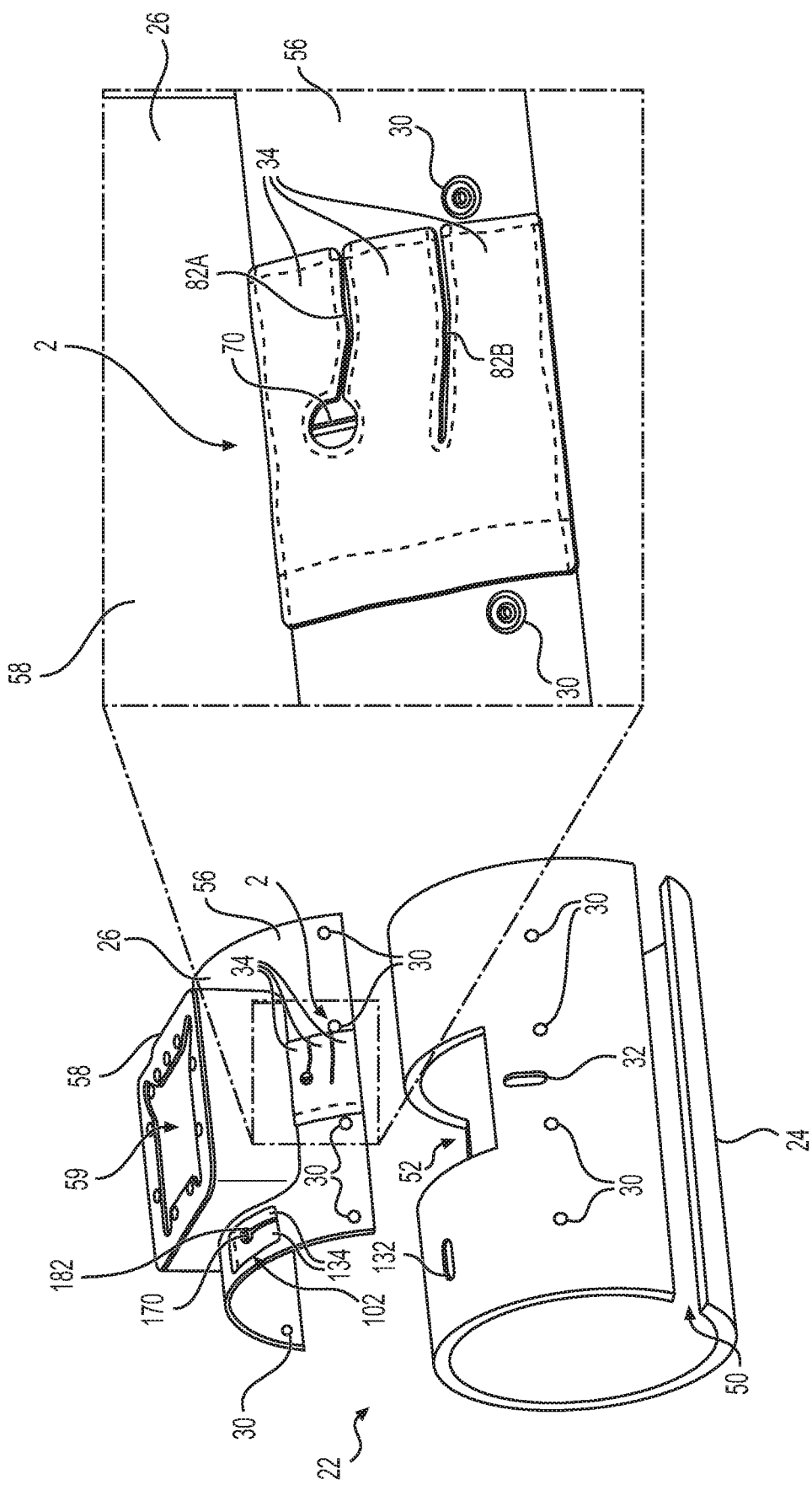
FIG. 2 is a partially exploded view of a portion of the insulation system of FIG. 1, according to aspects of the present disclosure.

FIG. 2 illustrates a partially exploded view of insulation assembly 22, including primary blanket 24 and secondary blanket 26. Primary blanket 24 may be configured to surround portions of either intake spool 18 or outlet spool 20. When arranged cylindrically, primary blanket 24 includes a gap 50, as primary blanket 24 may be formed of a substantially planar piece of insulating material when unmounted. In one aspect, primary blanket 24 may also include an opening 52, for example, to receive and thus fit around intake control box 46 or outlet control box 48. Alternatively, primary blanket 24 may include a plurality of openings to allow intake control box 46 or outlet control box 48 to be coupled to and/or mounted on intake spool 18 or outlet spool 20, for example, with the couplings and/or mountings extending through the openings in primary blanket 24 Furthermore, when coupled to intake spool 18, primary blanket 24 may include a bottom opening (not shown) to receive and fit around injection assembly 22.

As shown in FIG. 1, one end of primary blanket 24 may include straps 28. One end of each strap 28 may be fixedly coupled to one end of primary blanket 24, and another end of primary blanket 24 may include strap hooks 54 to receive the other end of each strap 28. Alternatively, primary blanket 48 may include one or more snaps, buttons, hook and loop fasteners (Velcro™), adhesives, magnets, etc. to removably couple straps 28. Accordingly, straps 28 may be coupled to strap hooks 54 to secure primary blanket 24 around intake spool 18 or outlet spool 20. In one aspect, straps 28 may be adjustable or elastic in order to couple primary blanket 24 to different sized spools 18, 20. Additionally, while primary blanket 24 is illustrated in FIG. 2 as including a gap 50, it is understood that primary blanket 24 may include a width when flat (or a internal circumference when rolled) that is greater than the external circumference of intake spool 18 or outlet spool 20 such that primary blanket 24 may be tightly coupled around intake spool 18 or outlet spool 20 in order to close gap 50 and thus fully encircle intake spool 18 or outlet spool 20.

As mentioned above, primary blanket 24 includes one or more slits 32, 132 to expose the sensors, wires, or cables positioned on or extending from intake spool 18 or outlet spool 20. Additionally, primary blanket 24 includes a plurality of couplings 30 to couple secondary blanket 26 to primary blanket 24 in order to further enclose spools 18, 20.

Primary blanket 24 may at least partially enclose portions of intake assembly 12 or outlet assembly 16. For example, as shown in FIG. 1, a first primary blanket 24 may circumferentially surround portions of intake spool 18 and a second primary blanket 24 may circumferentially surround portions of outlet spool 18. The first and second primary blankets 24 may be identical, may have arrangement of slits 32, 132 that are mirror images, or may have different arrangements of slits 32, 132. For example, the arrangement of slits 32, 132 in primary blanket 24 may depend on whether primary blanket 24 is surrounding intake spool 18 or outlet spool 20, and in order to accommodate any arrangement of sensors, wires, or cables such that the sensors, wires, or cables extending from spool 18, 20 align with slits 32, 132. In either aspect, secondary blanket 26 may be coupled to a portion of primary blanket 24 (e.g., via couplings 30) to enclose at least a portion of intake spool 18 or outlet spool 20 that is exposed by blanket 24.

As discussed above, secondary blanket 26 includes a plurality of couplings 30 (e.g., snaps, buttons, hook and loop fasteners (Velcro™), adhesives, magnets, etc.) to couple secondary blanket 26 to primary blanket 24. Secondary blanket 26 also includes one or more groups of fingers 34, 134. Fingers 34, 134 may be positioned on secondary blanket 26 such that fingers 34, 134 at least partially overlap with slits 32, 132 in primary blanket 24. For example, fingers 34, 132 may overlap with slits 32, 132, and may be non-parallel (e.g., perpendicular to) slits 32, 132. When fingers 34, 134 are closed, slits 32, 132 may be substantially insulated, but when fingers 34, 134 are open, slits 32, 132 may be substantially exposed.

Secondary blanket 26 may include a planar portion 56 to be positioned over and coupled to one of intake spool 18 or outlet spool 20 via primary blanket 24, such that the planar portion forms a partially circular portion around intake spool 18 or outlet spool 20. Additionally, secondary blanket 26 may include a rectangular portion 58 (e.g., side portions that include partially circular edges in order to match a curvature of spools 18, 20). Secondary blanket 26 may also include an open portion 59, for example, to receive and thus fit around intake control box 46 or outlet control box 48. Alternatively, secondary blanket 26 may include a plurality of openings (not shown) to allow intake control box 46 or outlet control box 48 to be coupled to and/or mounted on intake spool 18 or outlet spool 20.

Both primary blanket 24 and secondary blanket 26 may be formed of one or more heat insulating materials. In one aspect, primary blanket 24 and secondary blanket 26 may be formed of a silica or glass fabric. For example, primary blanket 24 and secondary blanket 26 may be formed of a silicon coated fiberglass. Primary blanket 24 and secondary blanket 26 may be formed of a plurality of layers of the insulating materials, and the layers may be identical or may be different, for example, with one or more internal layers being formed of a different insulating material and/or having different insulating characteristics than one or more outer layers. Primary blanket 24 and secondary blanket 26 may include a thickness of approximately ⅛ of an inch, ¼ of an inch, ½ of an inch, ¾ of an inch, one inch, etc. Primary blanket 24 and secondary blanket 26 may be the same thickness, or may include different thicknesses. Primary blanket 24 and secondary blanket 26 may also be flexible in order to contour around spools 18, 20 and the other components of aftertreatment system 10.

Fingers 34, 134 may be formed of the same insulating material and include the same thickness as secondary blanket 26. Alternatively, fingers 34, 134 may be thicker or thinner than secondary blanket 26, and/or may be formed of a different insulating material than secondary blanket 26. In one aspect, fingers 34, 134 may be approximately ⅛ of an inch thick. Fingers 34, 134 may include a width of approximately one inch, and a length of approximately four to six inches. Additionally, a width of fingers 34, 134 may vary (i.e., widen or narrow) in order to vary the spacing and/or openings between fingers 34, 134. Fingers 34, 134 may also be flexible in order to contour around one or more sensors, wires, or cables coupled to spools 18, 20, while also helping to prevent the sensors, wires, or cables from overheating or otherwise malfunctioning.

Figure 3:
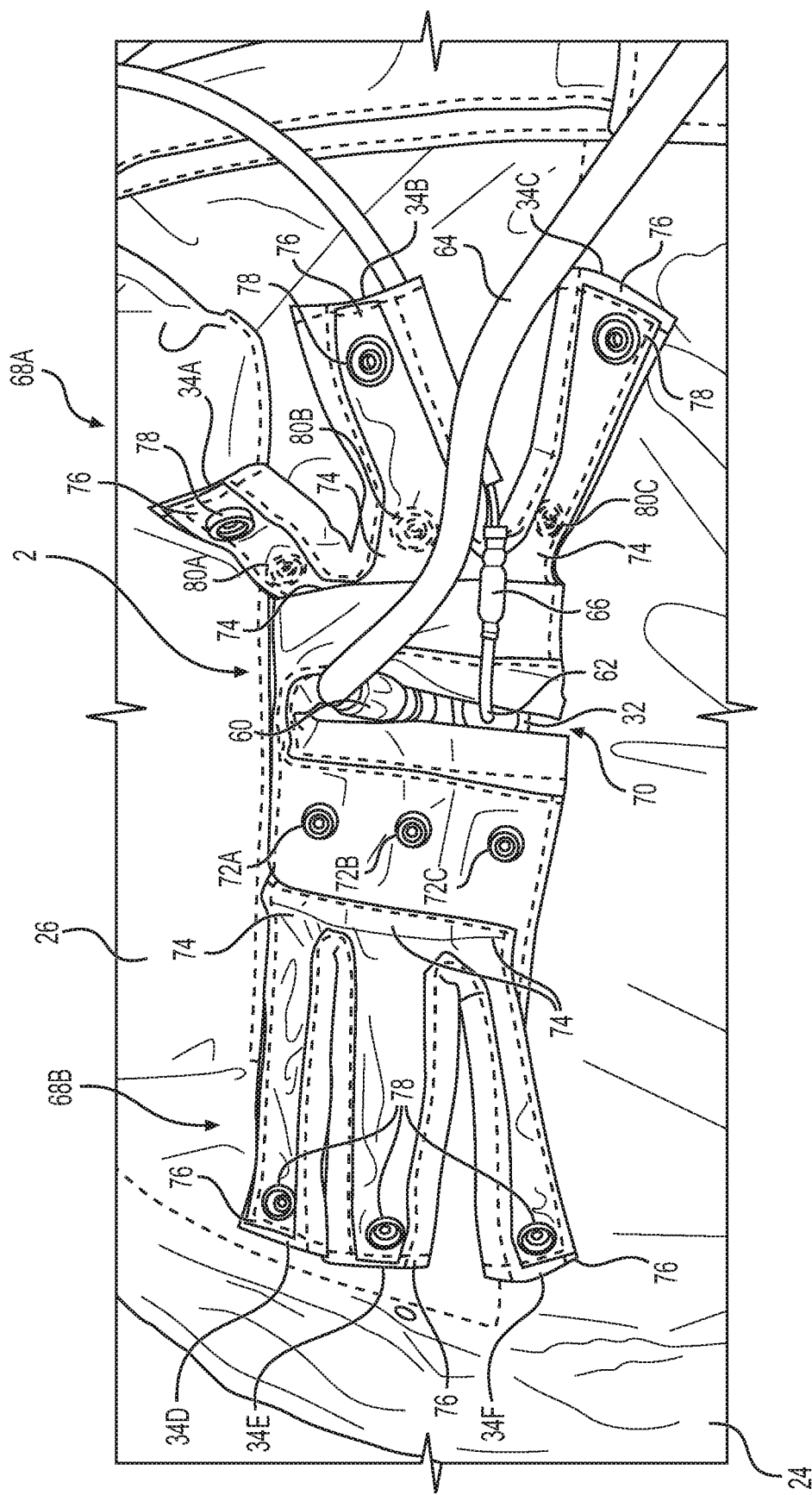
FIG. 3 is a top view of a portion of the insulation system of FIGS. 1 and 2 in an uncoupled configuration, according to aspects of the present disclosure.

FIG. 3 illustrates an exemplary arrangement of primary blanket 24 and secondary blanket 26 with fingers 34 of secondary blanket 26 in an open configuration. As shown, fingers 34 are positioned to at least partially align with each slit 32 in primary blanket 24. Fingers 34 may extend non-parallel (e.g., perpendicular) to slit 32. For example, slit 32 may extend in a first longitudinal direction, and fingers 34 may extend in a second longitudinal direction that is generally perpendicular to the first longitudinal direction. In one aspect, a first sensor 60 and a second sensor 62 may be coupled to intake spool 18, with respective first and second cables 64 and 66 coupled to each sensor 60, 62. Primary blanket 24 may include one slit 32 positioned through primary blanket 24 such that first sensor 60 and second sensor 62, along with first cable 64 and second cable 66 may extend through primary blanket 24. Secondary blanket 26 may include a plurality of fingers 34 arranged in two groups 68 on opposite sides of an aperture 70. With both primary blanket 24 and secondary blanket 26 positioned on intake spool 18 and coupled together, aperture 70 may be aligned with slit 32 and extend in the same longitudinal direction. In one aspect, aperture 70 and slit 32 are approximately the same length, and aperture 70 may be narrower than slit 32. Aperture 70 may be an opening extending from an exterior edge of secondary blanket 26. Additionally, a first group 68A of fingers 34 may be positioned on one side, for example, a right side of slit 32 and aperture 70, and a second group 68B of fingers 34 may be positioned on another side, for example, a left side of slit 32 and aperture 70. It is also noted that secondary blanket 26 may extend beneath fingers 34 to aperture 70. Stated another way, fingers 34 may be fixed to secondary blanket 26 at positions spaced away from aperture 70.

As shown in FIG. 3, first group 68A and second group 68B may each include three fingers 34. Secondary blanket 26 may include a plurality of internal couplings 72 on one side of slit 32. Each of fingers 34 may include a fixed end 74 and a free end 76. Each fixed end 74 may be integrally formed with secondary blanket 26, may be stitched to secondary blanket (e.g., with a heatproof or temperature resistant thread), or may be otherwise coupled to secondary blanket 26. Each free end 76 extends away from secondary blanket 26, and each free end 76 may include finger couplings 78 (e.g., snaps, buttons, hook and loop fasteners (Velcro™), adhesives, magnets, etc.). In one aspect, each finger 34 includes a finger coupling 78 on the free end 76. In another aspect, secondary blanket 26 may include fingers 34 with a rear coupling 80 on one side of aperture 70. For example, each finger 34 on the right side of aperture 70 may include a rear coupling 80. In this aspect, each finger 34 of first group 68A may include a rear coupling 80 on the fixed end 74, with rear coupling 80 being positioned on an opposite face of each finger 34 than finger couplings 78. It is noted that internal couplings 70, finger couplings 78, and rear couplings 80 may be non-conductive and/or insulated with an insulating material.

In order to insulate intake spool 18 and sensors 60, 62, each finger 34 of first group 68A may be secured in a closed position to at least partially cover slit 32 and aperture 70. Each finger 34 of first group 68A may be secured in a closed position (FIGS. 1 and 2) with each free end 76 secured to the other side of aperture 70 by coupling finger couplings 78 to a corresponding internal coupling 72. For example, a top finger 34A of first group 68A may be coupled to a top internal coupling 72A. An intermediate finger 34B of first group 68A may be coupled to an intermediate internal coupling 72B, and a bottom finger 34C of first group 68A may be coupled to a bottom internal coupling 72C. In order to further insulate intake spool 18 and sensors 60, 62, each finger 34 of second group 68B may be secured in a closed position (FIGS. 1 and 2) with each free end 76 secured to the other side of aperture 70 by coupling finger couplings 78 to a corresponding rear coupling 80. For example, a top finger 34D of second group 68B may be coupled to a top rear coupling 80A, such that top finger 34D at least partially overlaps with top finger 34A. An intermediate finger 34E of second group 68B may be coupled to an intermediate rear coupling 80B, and a bottom finger 34F of second group 68B may be coupled to a bottom rear coupling 80C. Accordingly, intermediate finger 34E at least partially overlaps with intermediate finger 34B, and bottom finger 34F at least partially overlaps with bottom finger 34C. As discussed above, each finger 34 may include a length of approximately four to six inches, for example, a length sufficient for respective finger couplings 78 to be coupled to either internal coupling 72 or rear coupling 80.

First sensor 60 and first cable 64 may extend through a space 82A (FIG. 2) formed between overlapping top fingers 34A, 34D and overlapping intermediate fingers 34B, 34E. Second sensor 62 and second cable 66 may extend through a space 82B (FIG. 2) formed between overlapping intermediate fingers 34B, 34E and overlapping bottom fingers 34C, 34F. As such, first sensor 60 and second sensor 62 may be coupled to intake spool 18 and may be electrically coupled to intake control box 46 or other components of aftertreatment system 10 while insulating intake spool 18. Moreover, one of spaces 82A and 82B, for example, first space 82A as shown in FIGS. 1 and 2, may include a circular opening or widened portion. For instance, the widened portion may be proximate to fixed ends 74 of top and intermediate fingers 32D, 32E in order to accommodate and/or surround a wider sensor, wire, or cable coupled to and extending from intake spool 18.

Figure 4:
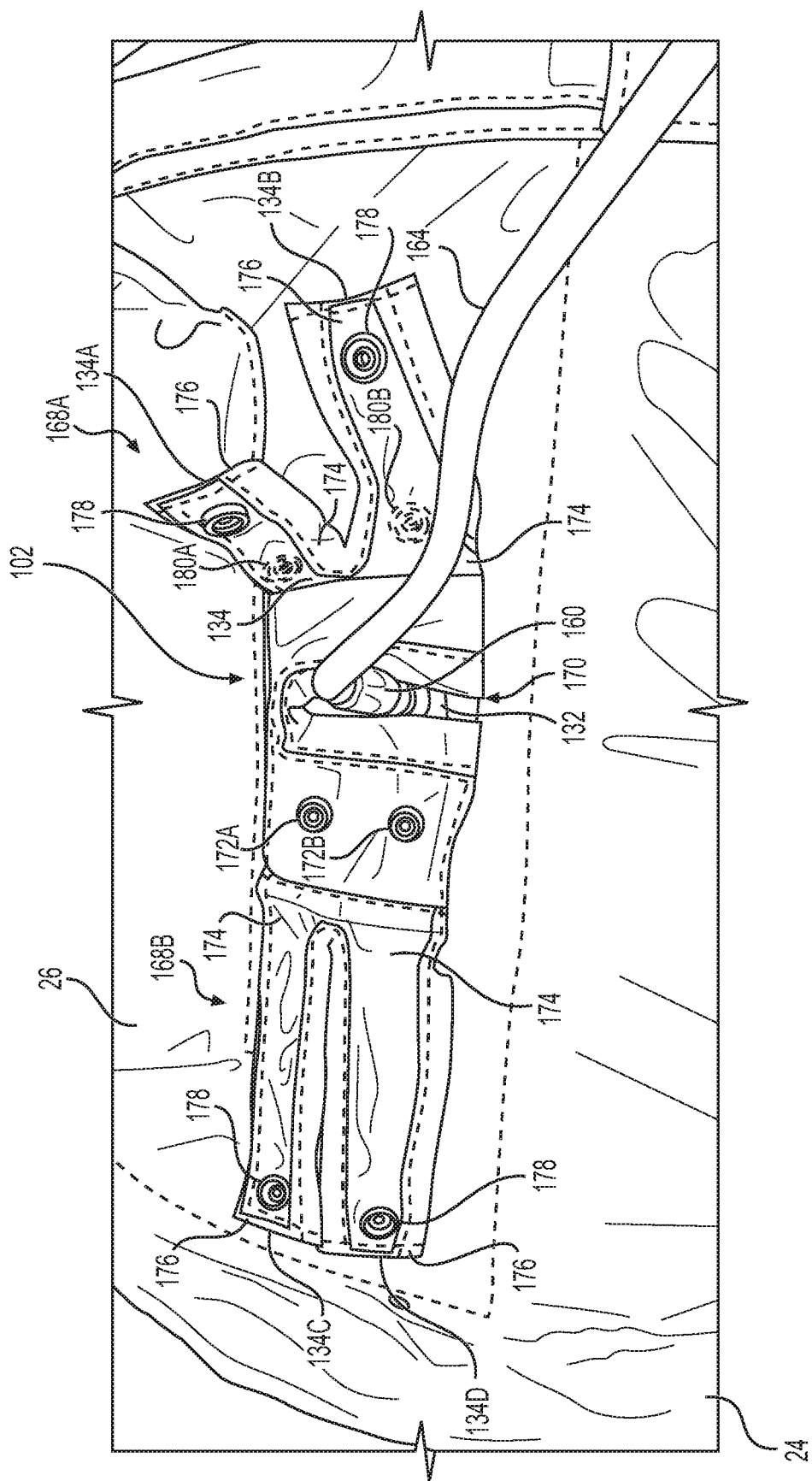
FIG. 4 is a top view of an alternative portion of the insulation system of FIGS. 1 and 2 in an uncoupled configuration, according to aspects of the present disclosure.

FIG. 4 illustrates another exemplary insulation arrangement 102 that may be formed by primary blanket 24 and secondary blanket 26. Insulation arrangement 102 includes slit 132 in primary blanket 24 and fingers 134 coupled to secondary blanket 26. For example, insulation arrangement 102 may include two fingers 134 coupled to secondary blanket 26 on either side of aperture 170. FIG. 4 illustrates fingers 134 of secondary blanket 26 in an open configuration. The configuration shown in FIG. 4 may be used to enclose and insulate, for example, a single sensor, wire, or cable coupled to and extending from intake spool 18 or outlet spool 20. Insulation arrangement 102 is shown in a closed configuration in FIGS. 1 and 2.

As discussed with respect to FIG. 3, secondary blanket 26 includes a plurality of internal couplings 172, and each finger 134 includes a fixed end 174 and a free end 176. Each fixed end 174 may be integrally formed with or otherwise secured to secondary blanket 26, and each free end 176 extends away from secondary blanket 26. Each free end 176 may include finger couplings 178 (e.g., snaps, buttons, hook and loop fasteners (Velcro™), adhesives, magnets, etc.). Additionally, one group 168 of fingers 134 on secondary blanket 26, for example, the right side of aperture 170, may include a rear coupling 180 on one side, with rear coupling 180 being positioned on an opposite face of each finger 134 than finger couplings 178.

In order to insulate intake spool 18 and sensor 160, each finger 134 of first group 168A may be secured in a closed position (FIG. 1) by coupling finger couplings 178 to a corresponding internal coupling 172 to at least partially cover slit 132 and aperture 170. For example, a top finger 134A of first group 168A may be coupled to a top internal coupling 172A, and a bottom finger 134B of first group 168A may be coupled to a bottom internal coupling 172B. In order to further insulate intake spool 18 and sensor 160, each finger 134 of second group 168B may be secured in a closed position (FIGS. 1 and 2) by coupling each free end 176 to the other side of aperture 170 by coupling finger couplings 178 to a corresponding rear coupling 180. For example, a top finger 134C of second group 168B may be coupled to a top rear coupling 180A, such that top finger 134C at least partially overlaps with top finger 134A, and a bottom finger 134D of second group 168B may be coupled to a bottom rear coupling 180B such that bottom finger 134D at least partially overlaps with bottom finger 134B. As discussed above, each finger 134 may include a length of approximately four to six inches, for example, a length sufficient for respective finger couplings 178 to be coupled to either internal coupling 172 or rear coupling 180.

Sensor 160 and cable 164 may extend through a space 182 (FIG. 2) formed between overlapping top fingers 134A, 134C and overlapping bottom fingers 134B, 134D. As such, sensor 160 may be coupled to intake spool 18 and may be electrically coupled to intake control box 46 or other components of aftertreatment system 10 while insulating intake spool 18.

Although this application discusses the sensors 60, 62 being coupled to intake spool 18, this disclosure is not so limited. For example, as discussed with respect to FIG. 1, sets of primary blanket 24 and secondary blanket 26 may be coupled to intake spool 18 and to outlet spool 20. Additionally, primary blanket 24 and secondary blanket 26 may be modified to be coupled around and insulate other components or elements of aftertreatment system 10, an engine, or other elements of a vehicular or non-vehicular machine.

INDUSTRIAL APPLICABILITY

The disclosed aspects of insulation assembly 22 may be used in any machine that includes a element that requires insulation and includes one or more sensors, piping, or cables extending from the element. Insulation assembly 22 described herein may provide a greater heat insulation without heat leaks, while also allowing the sensors and/or cables coupled to the insulated components to extend through insulation assembly 22. As such, there is a lower risk that the sensors and/or cables may overheat within the insulation assembly 22.

Under SOLAS requirements, aftertreatment system 10 must not have a skin or exposed temperature exceeding 220 C. The temperature limits includes inlet spool 18 and outlet spool 20, which often reach temperatures above the SOLAS requirements. In addition to inlet spool 18 and outlet spool 20, aftertreatment systems include various sensors, wires, and cables, which may be damaged or malfunction if exposed to high, potentially damaging temperatures. For example, aftertreatment systems, in particular, intake spool 18 or outlet spool 20 often include temperature sensors (temperature limit of approximately 120 C), pressure sensors or pressure difference sensors (temperature limit of approximately 125 C), NOx sensors and controls (temperature limit of approximately 100 C), NOx sensor wires (temperature limit of approximately 200 C), or other sensors, wires, or cables with respective temperature limits. Accordingly, it is important to both insulate the hot portions of aftertreatment system 10, while also not fully enclosing the sensors, wires, or cables that are coupled to aftertreatment system 10. When insulating aftertreatment system 10, one must not allow excessive heat to escape, and also must not fully cover the sensors, wires, or cables. The arrangement of primary blanket 24 and secondary blanket 26 insulates the hot portions of aftertreatment system 10, while also helping to prevent the sensors, wires, and cables from overheating and being damaged or malfunctioning.

Additionally, different arrangements of fingers 34, 134 may be employed in order to insulate aftertreatment system and protect various sensors, wires, and cables. For example, as shown in FIG. 3, slit 32 and two groups 68A, 68B of three fingers 34 may be used to insulate spools 18, 20 where two sensors, wires, or cables are coupled to and extend from the spool. In another example, a shown in FIG. 4, slit 132 and two groups 168A, 168B of two fingers 134 may be used to insulate spools 18, 20 where a single sensor, wire, or cable is coupled to and extends from the spool. Although not shown, additional arrangements of slits 32, 132 and fingers 34, 134 may be used to insulate spools 18, 20 where additional sensors, wires, or cables are coupled to and extend from the spools. The arrangements of slits 32, 132 in primary blanket 24 and fingers 32, 132 in secondary blanket 26 may help to insulate spools 18, 20 or other components of aftertreatment system 10, while also helping to prevent damage or malfunction of the one or more sensors 60, 62, 160, wires, or cables 64, 66, 164 coupled to or extending from spools 18, 20 or the components of aftertreatment system 10.

Furthermore, fingers 34, 134 may include various shapes and sizes. The various shapes and sizes may help to avoid having a common seam between overlapping or adjacent fingers 34, 134, which may also help insulate intake spool 18 or outlet spool 20 while surrounding and protecting sensors 60, 62, 160, wires, or cables 64, 66, 164. For example, fingers 34, 134 may taper or widen in width from fixed ends 74, 174 to free ends 76, 176. In one aspect, fingers 34, 134 on one side of aperture 70, 170 may be different shapes or sizes than fingers 34, 134 on the other side of aperture 70, 170. For instance, each finger 34, 134 of first groups of fingers 68A, 168A may taper from fixed ends 74, 174 to free ends 76, 176, and each finger 34, 134 of second groups of fingers 68B, 168B may widen from fixed ends 74, 174 to free ends 76, 176. For example, a first top finger 34A, 134A may taper from fixed end 74, 174 to free end 76, 176, and a second (or opposing) top finger 34D, 134C may widen from fixed end 74, 174 to free end 76, 176. In another aspect, top fingers 34A, 34D, 134A, 134C may each taper from fixed ends 74, 174 to free ends 76, 176, and intermediate fingers 34B, 34E (FIG. 3) or bottom fingers 134B, 134D (FIG. 4) may each widen from fixed ends 74, 174 to free ends 76, 176. Accordingly, the overlapping and/or adjacent fingers 34, 134 may form different seams to help insulate spools 18, 20, while surrounding portions of sensors 60, 62, 160, wires, or cables 64, 66, 164 to help prevent overheating.

The arrangements of slits 32, 132 in in primary blanket 24 and fingers 32, 132 in secondary blanket 26 may also help to allow an operator to quickly install or uninstall the one or more sensors, wires, or cables to spools 18, 20, or otherwise inspect or operate the sensors, wires, or cables, without the need to remove primary blanket 24 or secondary blanket 26. For example, the operator may quickly uncouple free ends 76, 176 of fingers 32, 132 in order to access the sensors, wires, or cables, or portions of the spools 18, 20, and then the operator may then recouple free ends 76, 176 of fingers 32, 132 to the either internal couplings 72, 172, finger couplings 78, 178, or rear couplings 80, 180 in order to insulate spools 18, 20, while also helping to prevent the sensors, wires, or cables from overheating or otherwise malfunctioning. Furthermore, the arrangement and material of primary blanket 24 and secondary blanket 26 may help to allow sensors, wires, or cables of various shapes and sizes to be coupled to spools 18, 20, while also helping to prevent the sensors, wires, or cables from overheating or otherwise malfunctioning.

It will be apparent to those skilled in the art that various modifications and variations can be made to the disclosed system without departing from the scope of the disclosure. Other embodiments of the system will be apparent to those skilled in the art from consideration of the specification and practice of the insulation systems and devices disclosed herein. It is intended that the specification and examples be considered as exemplary only, with a true scope of the disclosure being indicated by the following claims and their equivalents.

What is claimed is:

1. An insulation system for an aftertreatment system, comprising:
    a first insulating element including at least one slit; and
    a second insulating element including a plurality of fingers extending from opposing sides of an aperture,
    wherein the second insulating element is couplable to the first insulating element, and wherein, when the second insulating element is coupled to the first insulating element, the plurality of fingers overlap the at least one slit,
    wherein each finger of the plurality of fingers includes a fixed end and a free end, wherein the fixed end of a first finger is positioned on a first side of the aperture, wherein the fixed end of a second finger is positioned on a second side of the aperture,
    wherein the second insulating element includes at least one internal coupling positioned between the second finger and the aperture, wherein the free end of the first finger is configured to be coupled to the internal coupling, and
    wherein the first finger includes at least one rear coupling, and wherein the free end of the second finger is configured to be coupled to the rear coupling.

2. The insulation system of claim 1, wherein the at least one slit in the first insulating element extends in a first direction, and wherein the aperture in the second insulating element extends in the first direction.

3. The insulation system of claim 2, wherein each finger of the plurality of fingers extends in a second direction, and wherein the second direction is perpendicular to the first direction.

4. The insulation system of claim 1, wherein the plurality of fingers includes two groups of fingers positioned on opposing sides of the aperture, and wherein each group of fingers includes at least two fingers.

5. The insulation system of claim 4, wherein the free end of each finger is configured to be coupled to the second insulating element on the other of the first or second side of the aperture.

6. The insulation system of claim 5, wherein a first group of fingers includes at least two fingers with the fixed ends coupled to the first side of the aperture,
    wherein a second group of fingers includes at least two fingers with the fixed ends coupled to the second side of the aperture.

7. The insulation system of claim 6, wherein each finger of the second group includes a coupling element on the free end on an internal face, wherein the coupling element on the free end on the internal face of each finger of the first group is configured to be coupled to a coupling element on the second insulating element.

8. The insulation system of claim 1, wherein the second insulating element includes a planar portion configured to overlap with a portion of the first insulating element and a rectangular portion configured to extend away from the planar portion and beyond the first insulating element.

9. The insulation system of claim 1, wherein the first insulating element is a planar blanket, wherein the first insulating element includes a plurality of straps and hooks positioned on opposing ends of the planar blanket, and wherein the straps and hooks are configured to couple the first insulating element around a cylindrical intake or outlet element.

10. The insulation system of claim 1, wherein the first insulating element and the second insulating element, including the plurality of fingers, are formed of a silicon coated fiberglass.

11. An insulation assembly for an aftertreatment system, comprising:
    an intake spool;
    a treatment module coupled to the intake spool;
    an outlet spool extending from the treatment module;
    a first insulation assembly coupled to the intake spool, including a first primary blanket and a first secondary blanket, wherein the first secondary blanket is coupled to the first primary blanket; and
    a second insulation assembly coupled to the outlet spool, including a second primary blanket and a second secondary blanket, wherein the second primary blanket includes an aperture, and wherein the second secondary blanket is coupled to the second primary blanket, wherein the second secondary blanket includes a plurality of secondary blanket fingers, wherein each finger of the plurality of secondary blanket fingers includes a fixed end and a free end, wherein the fixed end of a first secondary blanket finger is positioned on a first side of the aperture, wherein the fixed end of a second secondary blanket finger is positioned on a second side of the aperture, wherein the second secondary blanket includes at least one internal coupling positioned between the second secondary blanket finger and the aperture, wherein the free end of the first secondary blanket finger is configured to be coupled to the internal coupling, and wherein the first secondary blanket finger includes at least one rear coupling, and wherein the free end of the second secondary blanket finger is configured to be coupled to the rear coupling.

12. The insulation assembly of claim 11, further including one or more sensors, wires, or cables extending from the intake spool, wherein the one or more sensors, wires, or cables extends through a first opening in the first primary blanket and through a second opening in the first secondary blanket.

13. The insulation assembly of claim 12, wherein the first opening in the first primary blanket is a slit through the first primary blanket, wherein the slit extends in a first longitudinal direction, wherein the second opening in the first secondary blanket is an aperture, and wherein the aperture at least partially overlaps with the slit when the first secondary blanket is coupled to the first primary blanket.

14. The insulation assembly of claim 13, wherein the first secondary blanket includes a plurality of fingers extending from opposing sides of the aperture, wherein each finger of the plurality of fingers extends in a second longitudinal direction, wherein the second longitudinal direction is perpendicular to the first longitudinal direction, and wherein the fingers are configured to surround a portion of the one or more sensors, wires, or cables extending from the intake spool.

15. The insulation assembly of claim 14, wherein each finger of a first group of fingers includes a coupling element on a first face of a free end, wherein the coupling element on the first face of the free end of each finger of the first group is configured to be coupled to a coupling element on the first secondary blanket on an opposite side of the aperture, and wherein each finger of the first group includes a coupling element on a second face of a fixed end, and wherein each finger of a second group of fingers includes a coupling element on a first face of a free end, with the coupling element on the first face of the free end of the fingers of the second group is configured to be coupled to the coupling element on the second face of the fixed end of one finger of the first group.

16. An insulation system for an aftertreatment system, comprising:

a first insulating element including at least one slit; and a second insulating element including a plurality of fingers extending from opposing sides of an aperture, wherein the second insulating element is couplable to the first insulating element, and wherein, when the second insulating element is coupled to the first insulating element, the plurality of fingers overlap the at least one slit, and wherein the second insulating element includes one or more internal couplings, wherein a first finger is couplable to one of the one or more internal couplings, and wherein a second finger on an opposite side of the aperture from the first finger is couplable to a rear coupling on the first finger.

17. The insulation system of claim 16, wherein the at least one slit in the first insulating element extends in a first direction, wherein the aperture in the second insulating element extends in the first direction, wherein each finger of the plurality of fingers extends in a second direction, and wherein the second direction is perpendicular to the first direction.

18. The insulation system of claim 16, wherein the second insulating element includes a planar portion configured to overlap with a portion of the first insulating element and a rectangular portion configured to extend away from the planar portion and beyond the first insulating element.

19. The insulation system of claim 16, wherein the first insulating element is a planar blanket, wherein the first insulating element includes a plurality of straps and hooks positioned on opposing ends of the planar blanket, and wherein the straps and hooks are configured to couple the first insulating element around a cylindrical intake or outlet element.

20. The insulation system of claim 16, wherein the first insulating element and the second insulating element, including the plurality of fingers, are formed of a silicon coated fiberglass.

* * * * *